United States Patent [19]

Gunther et al.

[11] 4,209,479
[45] Jun. 24, 1980

[54] MEANS FOR IMPROVING MANUFACTURE OF SOLID STATE CELLS

[75] Inventors: Philip B. Gunther, Hastings-on-Hudson; Robert Nikitopoulos, Carmel, both of N.Y.

[73] Assignee: P.R. Mallory & Co. Inc., Indianapolis, Ind.

[21] Appl. No.: 855,103

[22] Filed: Nov. 25, 1977

[51] Int. Cl.² .............................................. C25B 9/04
[52] U.S. Cl. ................................ 264/104; 264/105; 264/268; 264/269
[58] Field of Search ............... 264/268, 269, 104, 105; 429/104, 133, 134, 135, 167, 168, 169, 191, 239, 246

[56] References Cited

U.S. PATENT DOCUMENTS

| 3,198,862 | 8/1965 | Amthor ......................... 264/268 X |
| 3,988,164 | 10/1976 | Liang ............................. 429/191 |

*Primary Examiner*—Thomas P. Pavelko
*Attorney, Agent, or Firm*—Ronald S. Cornell; Israel Nissenbaum; Martin M. Glazer

[57] ABSTRACT

The manufacture of solid state cells with smearable cathode materials subject to radial expansion during cell discharge is improved by the consolidation of such materials within a radially rigid non-flexible wall-retaining member which serves as a jig for the cathode during the fabrication of the cell, and which is thereafter retained in the cell structure to control such radial expansion.

10 Claims, 13 Drawing Figures

MEANS FOR IMPROVING MANUFACTURE OF SOLID STATE CELLS

This invention relates to the manufacture of solid state cells having all the components, thereof, in solid form and especially cells having lithium as the solid anode material and a smearable material, subject to radial expansion during discharge, as the cathode.

In U.S. Pat. Nos. 3,959,012 and 3,988,164 assigned to the same assignee as the present invention, there are described solid-state lithium cells, wherein lead is a component of the cathode. It has been discovered that the cathodes of such cells present manufacturing problems directly related to the use of such lead as a conductive element. Lead has a tendency to smear, and the formation of cathodes, as described in the above patents, tends to foul the walls of compression die cavities wherein solid state cells are formed, thereby necessitating time-consuming and expensive cleaning procedures. The presence of lead, or for that matter, any reactive or conductive smearable substance, if not removed, may result in contamination of subsequent cells constructed in said cavity which contamination may lead to detrimental self-discharge of such cells.

It is therefore an object of the present invention to provide a means by which die cavity fouling by a smearable cathode material is substantially eliminated with said means being converted from a working jig to an actual cell component.

It is a further object to provide such means, whereby, when used as a cell component in juxtaposition with a radially expandable cathode the useful lifetime of the cell is thereby enhanced.

These and other objects of the present invention will be more apparent from the following further description as well as from the drawings wherein.

Generally, the present invention involves the placement within a solid state cell-manufacturing die cavity of a radially rigid non-flexible wall-retaining member into which a smearable cathode material is placed and pressure consolidated therewith. This rigid non-flexible wall-retaining member serves as a jig for the cathode material during the manufacturing procedures of the cell and, as a result of the consolidation, it becomes an integral part of the cell structure. In some of the embodiments, to be further described, the inclusion of the wall-retaining member in the cell in conjunction with a radially expanding cathode serves also to increase the useful lifetimes of the cells because of the particular properties of solid state cells in general and lithium halide electrolyte cells in particular.

Figure 1:
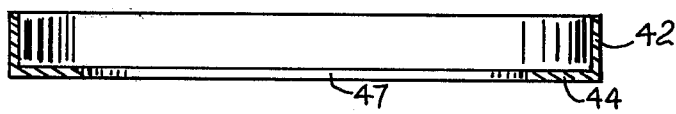
FIGS. 1-3 are cross-sectional views of three embodiments of the electrode jig/cum cell component of the present invention.
Figure 2:
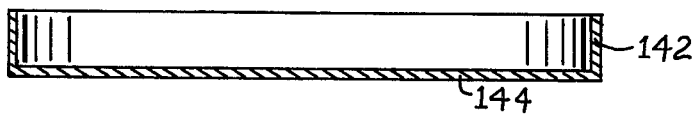
Figure 3:
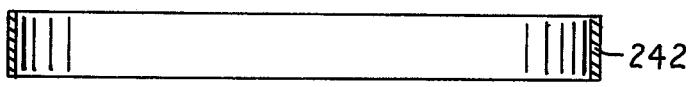

Three embodiments of the manufacturing jig and wall-retaining member as shown in FIGS. 1, 2, and 3 are a cup partially open at its bottom, with a concentric circular cutout, a completely closed cup, and a ring, respectively.

Electrode retaining members are known in the battery art. However, their use has been generally limited to cells having liquid or at least paste-like components. Their function in such cells has generally been to either contain the enclosed electrode material, thereby, preventing the loss of structural integrity of the electrode with resultant loose particles and concomitant cell shorting or to provide insulation means to likewise prevent cell shorting.

The formation and operation of such liquid containing cells is radically different from that of the formation and operation of truly solid state cells. Because of a lack of conductive fluid substances therein, solid state cells require extremely high pressure compression of components (25,000–100,000 or more psi) during manufacture of the cell in order to provide good interface contact and good conductivity between the various components. Such cells have an important advantage of long-term stability, (ten years or more shelf life), not generally found with fluid containing cells, since there are no corrosive fluid materials leading to the possiblity of leakage. However, with this advantage, resulting from lack of fluids, there is also a difficulty. It is the fluid electrolyte of cells, in general, which enables the flow of ions and the completion of the circuit internally. In solid state cells where ionic flow is only possible through intimate electrode-electrolyte contact, it is therefore of utmost importance that intimate interfaces between the solid electrode materials and the solid electrolyte be strongly made and maintained. Accordingly, the above mentioned high-compressive forces are vital to the accomplishment of this end. These compressive forces propagate the problem of smearing of a die cavity during construction of the cell when smearable substances, such as lead, are contained in the cell components.

As a result of cells containing fluid electrolytes not requiring such highly compressive constructions with concomitant problems, retaining means used therein exemplified by U.S. Pat. Nos. 3,222,555 and 3,466,194 are generally of nonconductive polymeric materials which are generally flexible and unable to endure high compressive forces unless they are of large thickness dimensions. Retaining means of such large thickness dimensions reduce the capacity of cells and such retaining means are therefore undesirable. The present invention therefore requires the use of a rigid nonflexible material such as a metal, examples of which include stainless steel and cold rolled steel, as well as other cathode-compatible materials.

Fluid containing cells generally do not have the smearing problem, above described, during manufacture since they are generally constructed in completely encapsulating individual containers for fluid retention and are arranged thereafter as desired into batteries of discrete individual components. Solid state cells, however, do not require nor generally contain individual cell containers with any container used being a package for the stacked cells. Accordingly, during manufacture thereof the internal cell components are in direct contact with a compression die cavity's walls thereby fouling them should the cathode material be smearable.

In U.S. Pat. No. 3,661,647 a cell is described in which all of the components (electrodes and electrolyte) are in the solid state. The cathode in such a cell is contained within a metallic cup. However, the cathode material is either elemental iodine or complexed iodides such as organic ammonium polyiodides which do not smear during cell construction. Furthermore, when a cell composed of such material is discharged, the cathode either remains at the same volume or only slightly expands at the cathode-electrolyte interface. The use of a cup for containing the iodine cathode is dictated by the characteristics of elemental iodine which is corrosive and gives off reactive vapors. In solid state cells not having corrosive (or mobile) cathode materials metallic discs alone are used for current collectors and intercell connections.

Figure 4:
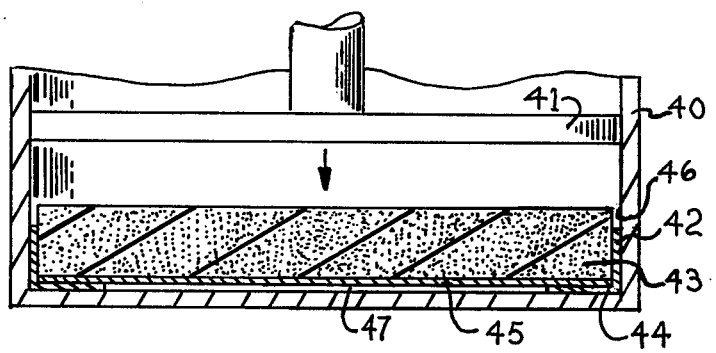
FIGS. 4-8 are a step-wise schematic sequential depiction of the manufacture of cells using the embodiment of FIG. 1 of the present invention.

In FIG. 4, the preferred embodiment of the wall-retaining means, a cup 42 partially open at its bottom 44, is placed within a die cavity 40 where it snugly engages the walls 46.

Figure 5:
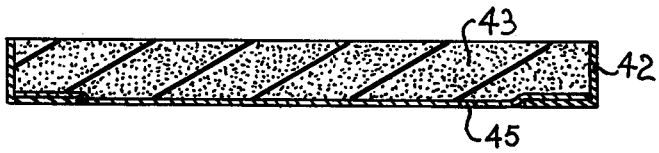

A thin metallic disc 45 is seated on the bottom of the partially open ended cup 42 for use as a cathode current collector. A preformed pellet or measured amount of cathodic material 43 including smearable conductive material is placed within the partially open ended cup 42. Ram 41 compresses the cathode material flush with the upper end of the cup 42 with little, if any, of the cathode material contacting wall 46. The cathode pellet 43 is thereby consolidated with cup 42. The pressed pellet is shown in FIG. 5 (apart from the die cavity through the pellet and cup are not actually removed) wherein the cathode pellet 45 is shown as not extending above the cup 42 and the cathode current collector 45 being compressed into the open area 47 of FIG. 5.

Figure 6:
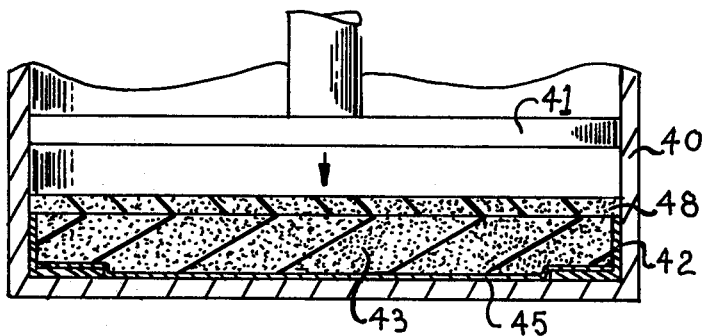
Figure 7:
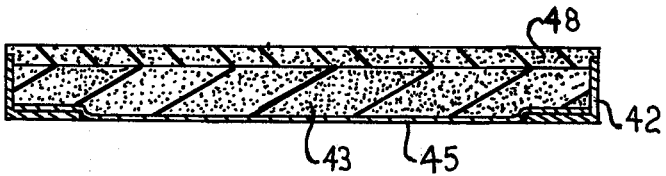

FIG. 6 shows the next step in the manufacture of a cell wherein the same die cavity is used and a solid preformed pellet of electrolyte 48 is placed on top of the compressed cathode pellet 43 and is then subjected to compressive forces, as shown by the arrow, by ram 41. FIG. 7 (shown apart from the die cavity, though not actually removed therefrom) shows the resultant structure wherein the electrolyte 48 has been compressed and adhered to cathode 43 along its entire interface with cathode 43. It is preferred that the electrolyte 48 extend a short distance below the top of cup 42.

Figure 8:
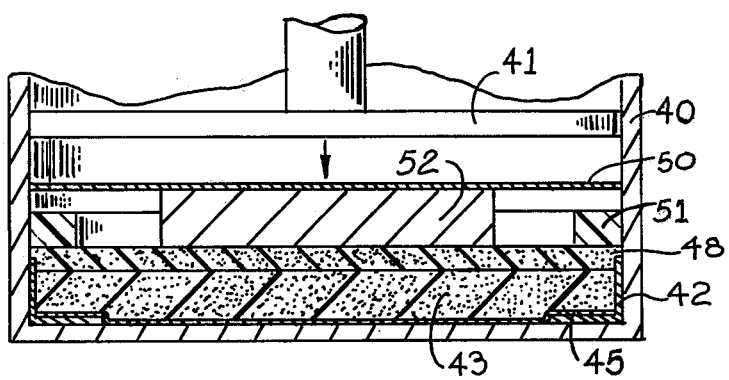
Figure 9:
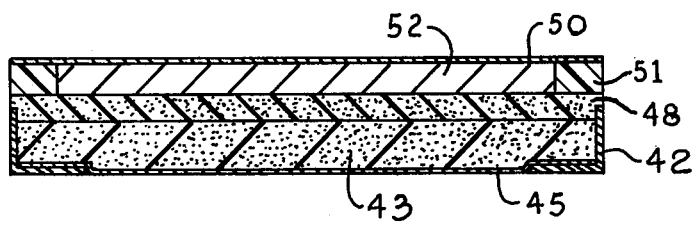
FIGS. 9-10 are cross-sectional views of a cell made as depicted in FIGS. 4-8 and that of a prior art cell respectively as fully assembled.
Figure 10:
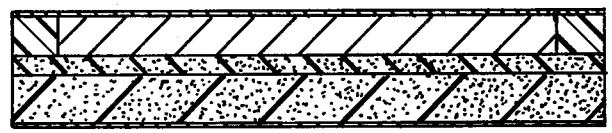

FIG. 8 shows the final step in the process taking place in the die cavity wherein an insulative ring 51 of polymeric material is peripherally placed on top of the electrolyte and a disc of anode metal 52 together with its metallic current collector 50 is compressed onto the electrolyte 58 by ram 41. A completed cell as removed from the die cavity is shown in FIG. 9. FIG. 10 is a prior art cell made in a manner substantailly the same as the cell for FIG. 9 but without a wall-retaining member around the cathode. The finished cell should have a cathode which does not extend above the height of the wall-retaining member.

The die cavity upon construction of the cell depicted in FIG. 9 is clean and ready for reuse. However, the die cavity used in the construction of the cell depicted in FIG. 10 is fouled thereby and requires expensive and time consuming cleaning to make it suitable for reuse.

It has been further discovered that the two embodiments shown in FIGS. 1 and 2, i.e. the closed cup of FIG. 2 with side wall 142 and bottom 144, and the partially open ended cup of FIG. 1, with side wall 42 and bottom 44 having a circular cutout 47, have additional structural advantages over the ring of FIG. 3 (having only side wall 242) during the operation of the completed cell aside from that of manufacturing ease. Because of cathode expansion, of about 15% or more of the original volume, solid state cells encounter a problem peculiar only to solid state cells. The movement of a cathode during discharge, engendered by expansion, tends to upset the interface between cathode and electrolyte and the already limited discharge capability of solid state cells can be prematurely reduced to unusable rates. This defect resulting from cathode movement may be attributed to the increased resistivity caused by a reduced interface between cathode and electrolyte.

Additionally, unchecked cathode electrode expansion may result in elongation and the production of cracks in the relatively rigid solid electrolyte to which the electrode is adheringly compressed. These cracks provide pathways for direct communication between the electrodes thereby rendering possible internal short circuits with resultant decreased cell life. Lithium halide and in particluar lithium iodide are commonly used as electrolytes in solid state cells (more fully described in U.S. Pat. No. 3,713,897 and incorporated by reference herein) and are relatively rigid and tend to crack upon flexation. Additionally, these electrolytes are cationically conductive thereby engendering reaction product build-up at the cathode with concomitant cathode expansion.

The present invention, as exemplified by the embodiments of FIGS. 1 and 2, provides for a means by which the radial growth of a cathode in a solid state cell, can be controlled. This means both compensates for the depletion of an anode while at the same time maintains a good ionically conductive interface between the growing cathode and a relatively rigid electrolyte without the appearance of detrimental cracks in the electrolyte. The radial growth of the cathode is controlled by the consolidation of the cathode material within cup structures. Accordingly, these cup structures must have sufficient strength to maintain their structural integrity during the consolidation process as well as during the manufacture of the cell and must have a minimal degree of resiliency. The lack of resiliency of the cups is an important factor since only a small degree of radial expansion can be sufficient to result in a separation between cathode and electrolyte. Thus normal retaining means, generally used in cells made of resilient plastic materials, generally lack the necessary strength and inflexibility for the operation of the present invention. Additionally, in the preferred embodiment of the present invention, plastic members, which are insulative in nature would necessitate the additional use of conductive elements for intercell connections. As a result of the above criteria, cups made of radially rigid metallic material are the preferred retaining members because of their particular rigidified structure.

During discharge, the cathode material rises and maintains contact with the electrolyte at the cathode-electrolyte interface with the cathode being substantially contained within the wall-retaining member, and the growth of the cathode being axially directed thereby compensates for anode shrinkage.

It is preferred that the cathode in the finished cell be compressed below the upper level of the wall-retaining member such that cathode movement in the direction of the electrolyte is substantially uniform. However, an embodiment wherein the cathode is flush with the top of the wall-retaining member will also operate but to a lesser degree.

Active anode materials useful in the cells of the present invention include alkali and alkaline earth metals such as lithium, sodium, potassium, magnesium and calcium as well as aluminum and generally metals above hydrogen in the EMF series.

Solid electrolyte materials useful in the cells of the present invention are those materials which are cationically conductive such that reaction products swell the cathode. Examples of such materials include the aforementioned lithium iodide and other halides as well as other ionically conductive-electronically non-conductive alkali and alkaline earth metal salts chemically compatible with the electrodes with which they are in contact.

Active cathode materials which are expandable during discharge in the finished cell of the present invention include lead sulfide, lead iodide, as well as other metal sulfides, halides, selenides, telluride and generally metal salts or oxides. Sulfur, iodine, and other elemental cathodic materials will also be expandable when used in conjunction with a cationically conductive electrolyte and high energy density anodes.

Smearable materials in the cathode for which the jig/wall-retaining means are useful in preventing die cavity fouling include the aforementioned lead, lead compounds, indium, gold, graphite, and carbon.

The following are Examples of cells constructed with the three embodiments shown in FIGS. 1-3 and which have been manufactured in accordance with the procedure depicted in FIGS. 4-8. These cells are compared with substantially identical cells made in accordance with the prior art and depicted in FIG. 10. These Examples are set forth primarily for the purpose of illustration and any specific enumeration of detail contained therein should not be construed as limitations. Except where indicated, all parts are parts by weight.

EXAMPLE 1

Cells are made in accordance with the above described and depicted procedures, with the cathode of each cell being pressed originally into a partially opened cathode cup with a pressure of 10,000 psi. The electrolyte is thereafter pressed onto the cathode with a pressure of about 60,000 psi. The cell is thereafter completed with an anode of lithium pressed onto the electrolyte with a pressure of 100,000 psi. Each cell has a diameter of about 0.6 inches and a height of about 0.06 inches. The cathode material is approximately 1 gram of a mixture having the composition of 20 percent lead, 40 percent lead iodide ($PbI_2$), and 40 percent lead sulfide ($PbS$). The respective dimensions of the various cell components as shown in FIG. 9 includes a 30 mil height cathode (taken at the center), a 10 mil height electrolyte which comprises lithium iodide, lithium hydroxide and aluminum oxide in a 4:1:2 ratio and a 20 mil height lithium disc with the disc having a diameter of 0.54 inches. The cell is cathode limited with an excess of lithium. The cathode current collector comprises a 1 mil thick layer of lead and the anode current collector is a 1 mil thick layer of titanium. The dimensions of the partially opened cathode ring include an outer diameter of 0.6 inches, an inner diameter of 0.5 inches, a height of 35 mils and a wall thickness of 5 mils. Six of such complete cells are arranged into a battery with two stacks (each of three cells in series) arranged in parallel.

EXAMPLE 2

Cells are made in accordance with the procedure of Example 1, but with the embodiment shown in FIG. 2 (a closed cup) replacing the partially opened cup of Example 1 and a battery is similarly constructed.

EXAMPLE 3

Cells are made in accordance with the procedure of Example 1 but with the embodiment shown in FIG. 3 (a ring) replacing the partially opened cup of Example 1.

PRIOR ART EXAMPLE

Cells are made in accordance with the procedure of Example 1, but without any wall-retaining member around the cathode.

EXAMPLE 4

Figure 11:
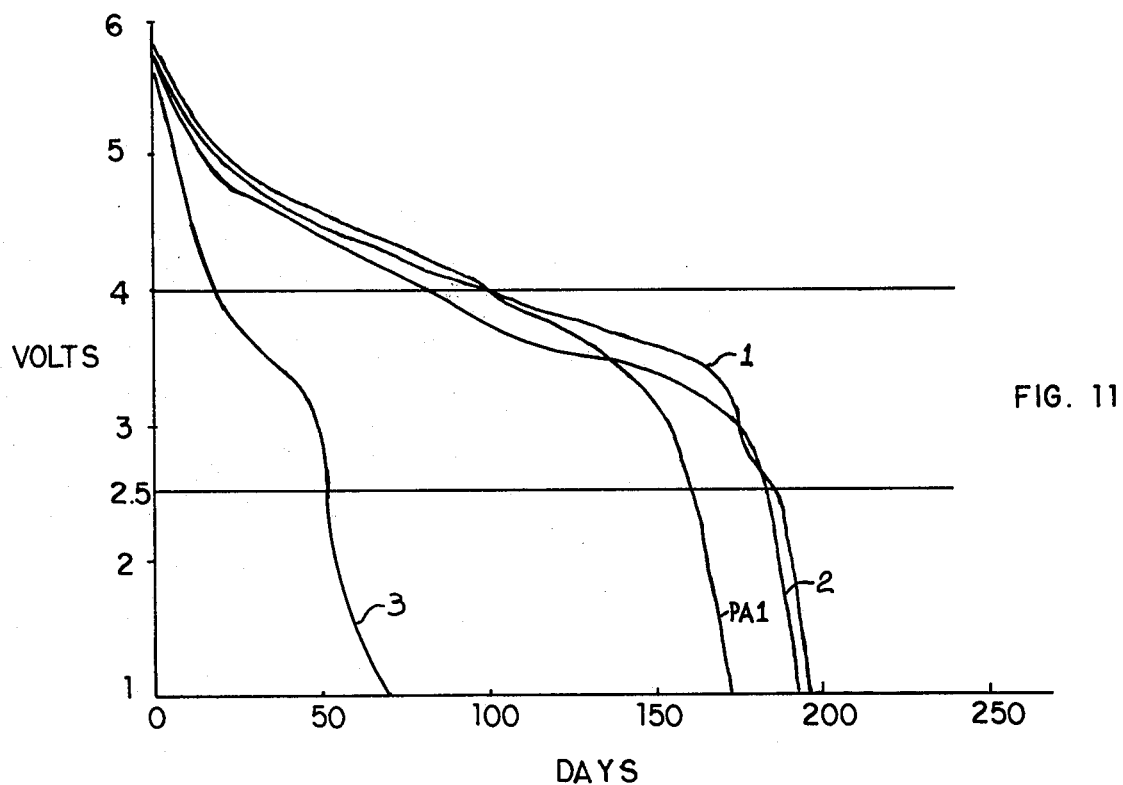
FIGS. 11-13 are comparative discharge curves of the cells of FIG. 9 and 10 as well as substantially similar cells made with the embodiments shown in FIGS. 2 and 3 of the present invention.

Batteries made in accordance with Examples 1-3 and the Prior Art Example are discharge at 71° C. with a 23 kohm load with the average results shown in FIG. 11. The discharge curves are correspondingly numbered 1-3 and Prior Art.

EXAMPLE 5

Figure 12:
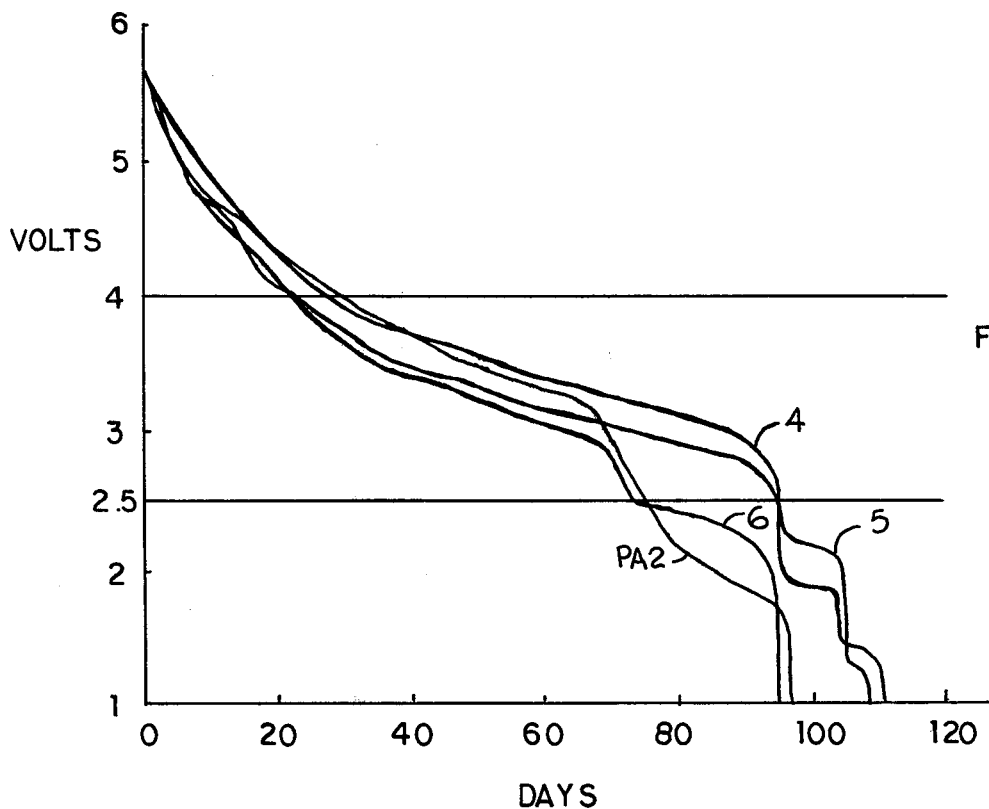

Batteries are made in accordance with Example 1-3 and the Prior Art Example are discharged at 71° C. with a 12 kohm load with the average results shown in FIG. 12. The discharge curves are correspondingly numbered 4-6 and Prior Art 2.

EXAMPLE 6

Figure 13:
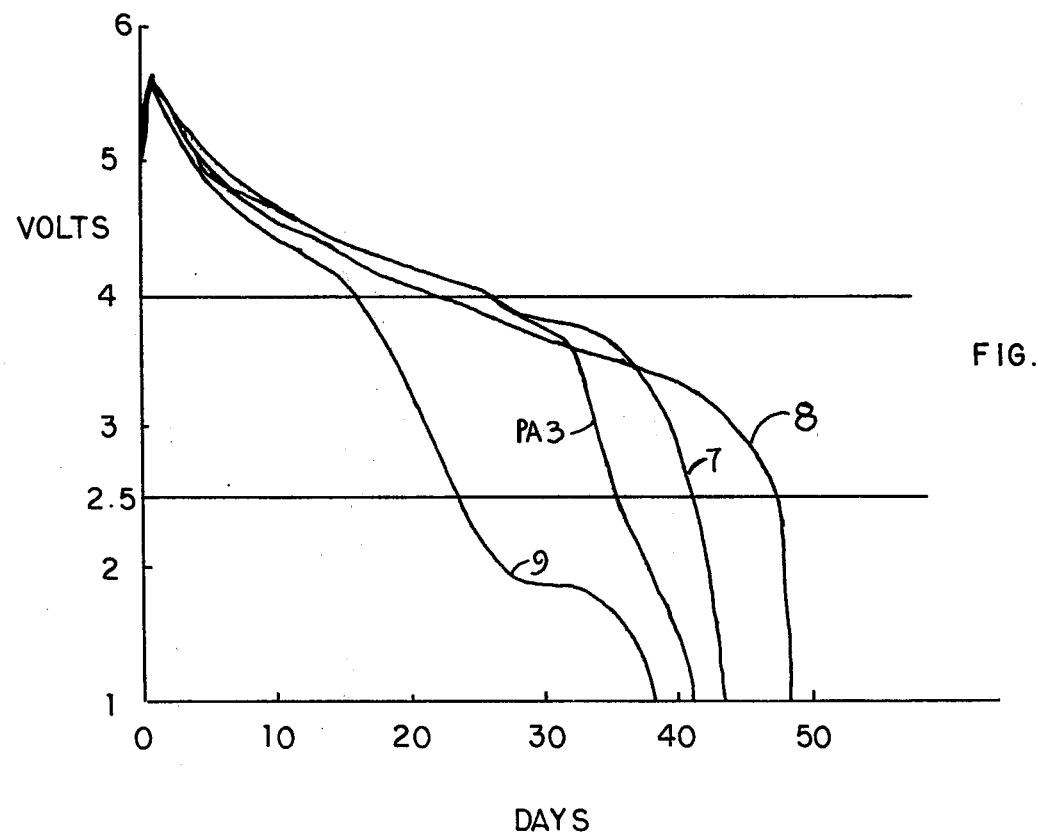

Batteries are made in accordance with Examples 1-3 and the Prior Art Example are discharged at 100° C. on a 6 kohm load with the average results shown in FIG. 13. The discharge curves are correspondingly numbered 7-9 and Prior Art 3.

It may be noted that in FIGS. 11-13 the use of the open ended cup as well as the closed cup have improved long term discharge characteristics as compared to that of the Prior Art and that of the embodiment wherein a ring is used. The embodiment of Example 3 (a ring) is believed not to have the structural strength of the embodiments of Examples 1 and 2 (open and closed cups) with the same thickness parameters. Accordingly, long term discharge may not be improved by the use of such ring. However, the ring is useful during the manufacturing process in preventing die cavity fouling should this be the desired criterion. Additionally, rings having greater thickness parameters than those of the cup embodiments may attain sufficient rigidity to satisfactorily contain the radially expanding cathode while maintaining optimum energy densities.

It is understood that the foregoing Examples are only for purposes of illustration and that changes and variations in cell construction and the structure of the wall-retaining means may be made without departing from the scope of the present invention.

What is claimed is:

1. A method for the manufacture of solid state cells comprising the steps of placing a radially rigid non-flexible wall retaining member within a compression die cavity, placing a smearable cathode material into said wall retaining member, with said wall retaining member separating said cathode material from the walls of said die, placing and compressing a solid electrolyte onto said cathode material, compressing an anode material onto said electrolyte, and retaining said wall retaining member as a component of said cell wherein said wall retaining member encloses all of the height of said cathode and at most, part of the height of said electrolyte.

2. The method of claim 1 wherein said cathode is consolidated within said wall-retaining member prior to the compressing of said solid electrolyte onto said cathode.

3. The method of claim 1 wherein said wall-retaining member is a closed ended cup.

4. The method of claim 1 wherein said wall-retaining member is a ring.

5. The method of claim 1 wherein the top of said cathode material is compressed to a level below the upper end of said wall-retaining member.

6. The method of claim 1 wherein said smearable cathode material contains lead.

7. The method of claim 6 wherein said smearable cathode material further includes a member of the group consisting of lead iodide, lead sulfide, and mixtures thereof.

8. The method of claim 7 wherein said anode is lithium and said electrolyte contains lithium iodide.

9. The method of claim 1 wherein said wall-retaining member is a cup partially open at its bottom with a concentrically circular cutout.

10. The method of claim 9 wherein said open ended cup is comprised of stainless steel.